Aug. 14, 1956   H. G. F. BUTLER   2,758,726
LOADING APPARATUS
Filed Nov. 7, 1950   6 Sheets-Sheet 1
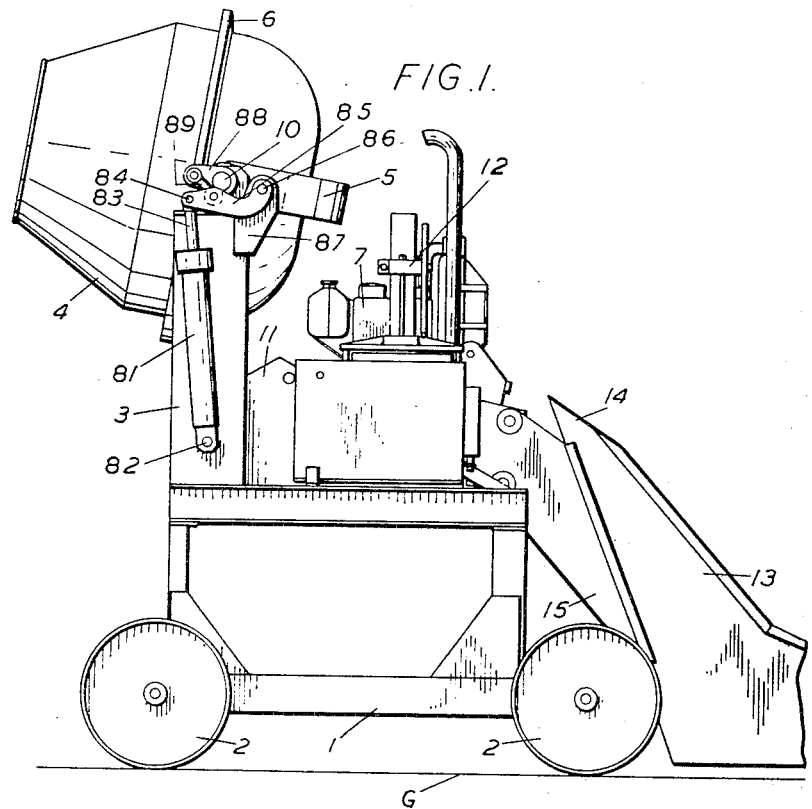
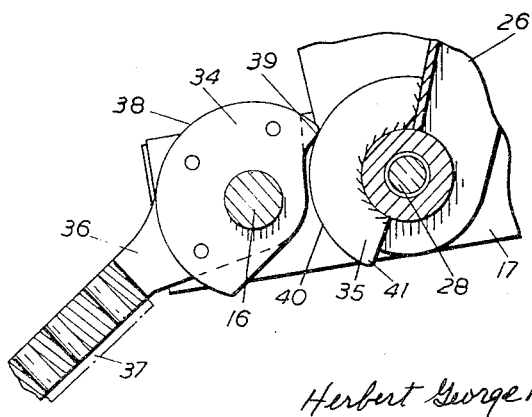
Inventor
Herbert George Frederick Butler
By Mason, Kolehmainen, Rathburn & Wyss
Attorneys Aug. 14, 1956    H. G. F. BUTLER    2,758,726
LOADING APPARATUS
Filed Nov. 7, 1950    6 Sheets-Sheet 2
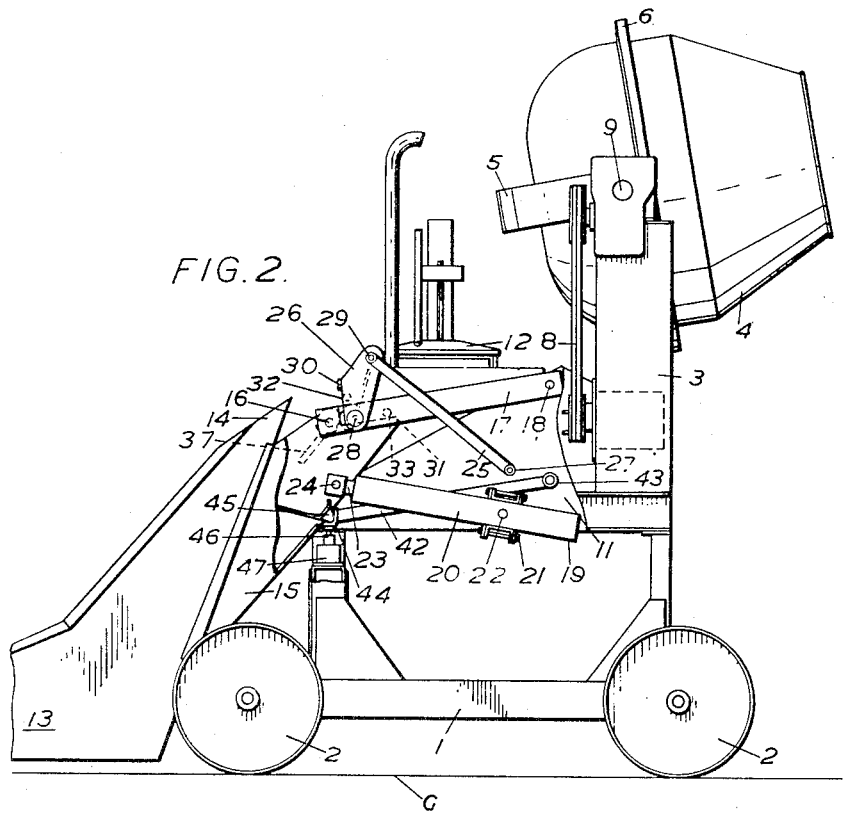
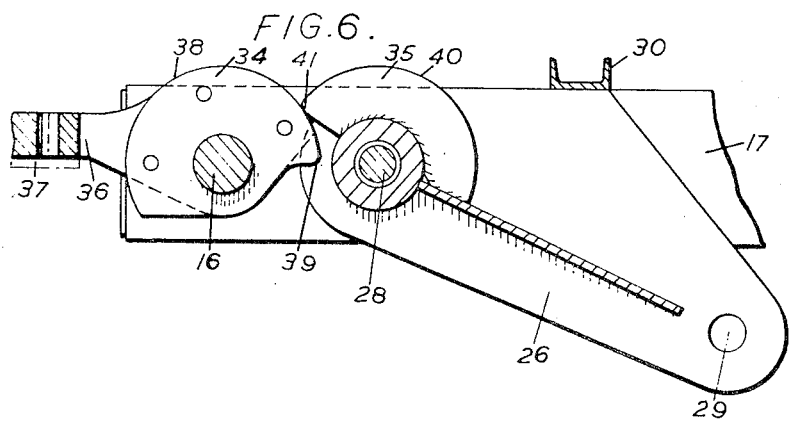
Herbert George Frederick Butler
Inventor
Mason, Kolehmainen, Rathburn & Wyss
By
Attorneys

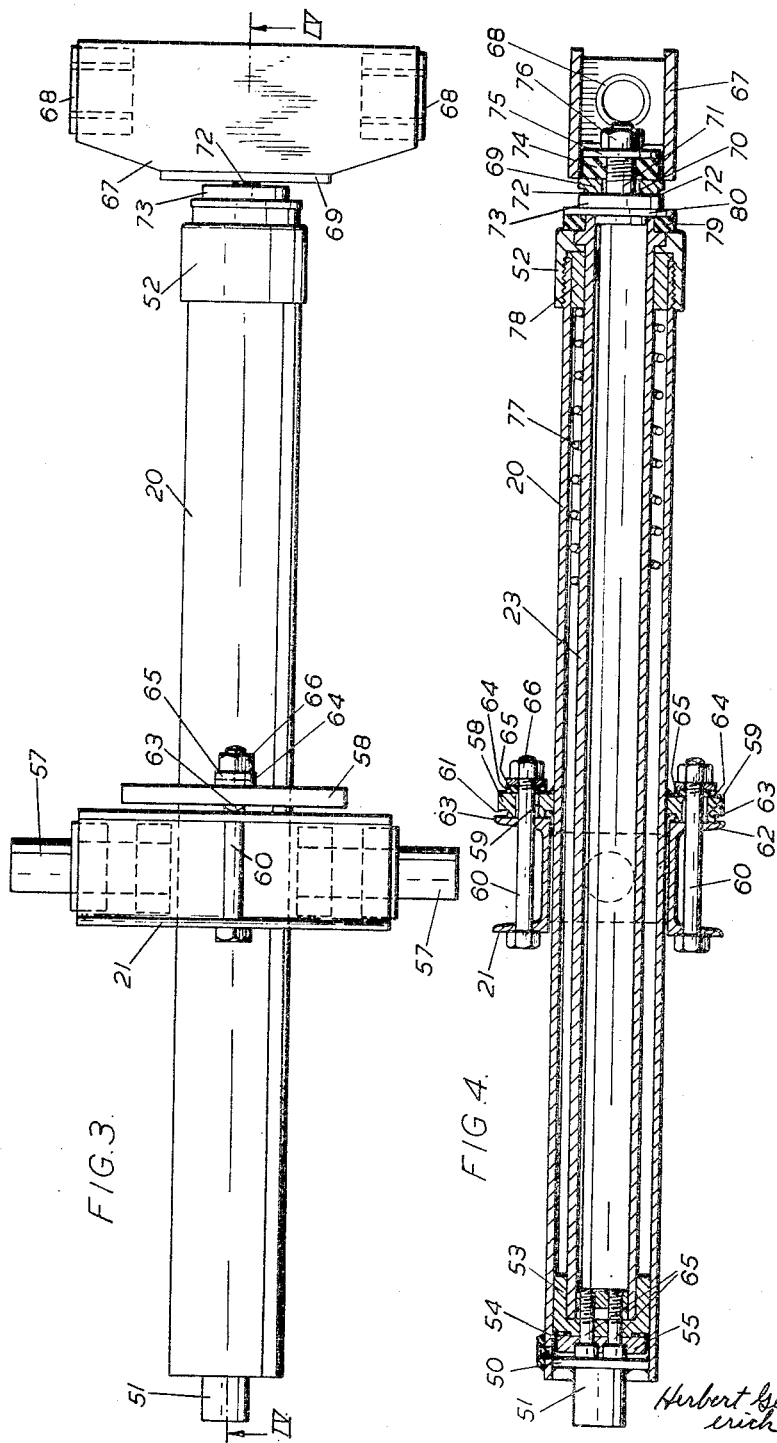

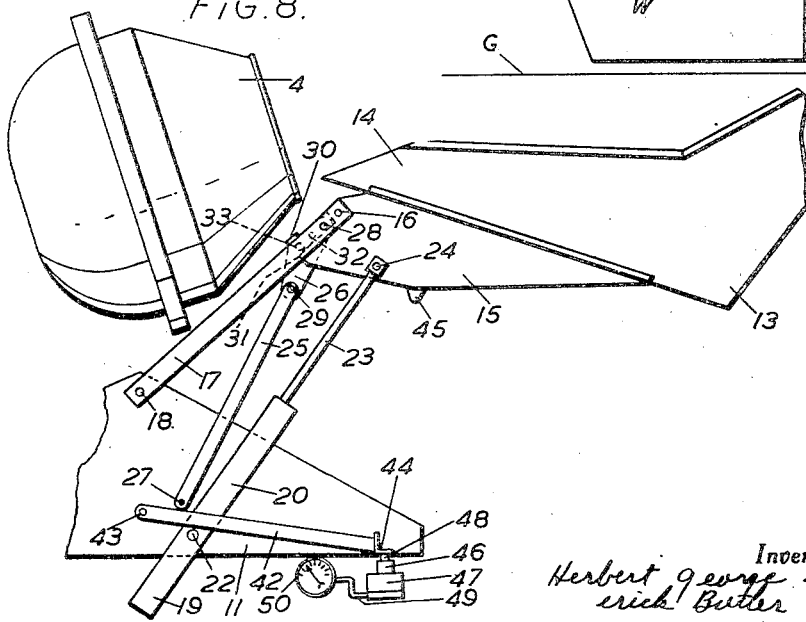

Aug. 14, 1956

H. G. F. BUTLER 2,758,726

LOADING APPARATUS

Filed Nov. 7, 1950

Inventor
Herbert George Frederick Butler
By Mason, Kolehmainen, Rathburn & Wyss
Attorneys Aug. 14, 1956  H. G. F. BUTLER  2,758,726
LOADING APPARATUS
Filed Nov. 7, 1950  6 Sheets—Sheet 6

Inventor
Herbert George Frederick Butler
By Mason, Kolehmainen, Rathburn & Wyss
Attorneys United States Patent Office 2,758,726
Patented Aug. 14, 1956

2,758,726
LOADING APPARATUS

Herbert George Frederick Butler, Rainham Mark, Gillingham, England, assignor to Winget Limited, Rochester, England Application November 7, 1950, Serial No. 194,468

Claims priority, application Great Britain November 10, 1949

24 Claims. (Cl. 214—2)

This invention relates to mixing machines and also to apparatus for loading materials into mixing and other machines of the type which includes a skip or hopper (hereinafter referred to as a hopper) which is mounted for movement between a lower position in which the materials can conveniently be loaded into it, by hand or otherwise, and an upper or discharge position in which the materials in the hopper are discharged into the mixing drum or other part of the machine.

In many machines it is necessary that the materials loaded into the mixing drum or other receptacle should be measured or weighed. Thus in a concrete mixing machine measured quantities of the aggregate, cement and/or other materials have to be loaded into the mixing drum.

For loading the materials into the drum it is known to use a hopper or skip which is pivotally connected to the machine so as to be movable between a lower loading position and an upper discharge position from which the materials are discharged into the mixing drum. In such machines it has been proposed to arrange for the hopper, when in its lower position, to rest on a weighing device, which indicates the weight of the materials in the hopper and which consequently enables the desired quantities of the materials to be loaded into the hopper for each batch which is to be mixed in the drum.

This known arrangement suffers from certain drawbacks which are due largely to the fact that the hopper has a tilting movement about its point of connection with the machine. The effect of this is to make the pressure exerted on the weighing device dependent on the distribution of the materials in the hopper, with the result that the variations in this distribution may produce considerable errors in the weighing.

With a view to minimising this difficulty the weighing device has generally been mounted immediately beneath the main portion of the hopper into which the materials are loaded, but this introduces a further disadvantage since it usually necessitates mounting the weighing device at some distance from the main body of the machine. This involves making the frame of the latter larger than would otherwise be necessary and results in the weighing device being located in a position where it is liable to damage and to have its operation upset by materials dropped on it. Furthermore, the errors in weighing, while being reduced, are not eliminated.

In order to avoid all errors in weighing it has been proposed to arrange for the hopper, when it reaches its lower position, to rest on and to be wholly supported by a weighing platform which is mounted for parallel movement in the usual way, while at the same time the pivotal connection between the hopper and the body of the machine is broken. This avoids errors in weighing but necessitates the use of a cumbersome platform structure arranged at some distance from the main frame of the machine, while the necessity for disconnecting the hopper from the machine and for ensuring its proper re-connection with it introduces practical difficulties and drawbacks.

It is one of the principal objects of this invention to provide an improved arrangement of the hopper and weighing mechanism which largely overcomes many of the disadvantages of the known structures.

With concrete and other mixing machines, particularly those of the larger sizes, it is sometimes desired to provide for a relatively large movement of the hopper between its loading and discharge positions. This gives rise to certain difficulties when use is made of a hopper which is rigidly mounted on an arm or cradle pivoted to the frame of the machine, since if a large lift is to be obtained the hopper must extend a considerable distance from the point of connection with the frame of the machine, while when attempting to use a hydraulic ram for raising such a hopper practical difficulties are encountered in obtaining a satisfactory positioning of the ram. Furthermore, with many known constructions there is a risk of the material being spilt during the raising of the hopper.

It is accordingly a further object of this invention to provide an improved mounting for the hopper by means of which many of the disadvantages of the known arrangements may largely be overcome.

Another object of the invention is the provision of an improved construction of the ram while a still further object is the provision of improved means for mounting the ram so as to allow it the necessary freedom of movement during the working of the machine.

It is a further object of the invention to provide means for ensuring the return of the hopper from its discharge position.

It is yet another object of the invention to provide an improved form of mechanism for effecting the tilting of the mixing drum in a machine of the tilting drum type.

For a better understanding of the invention, in its various aspects, a number of embodiments thereof will now be described in greater detail, by way of example. Reference will be had to the accompanying drawings, in which:

Figure 1 is a side view of a concrete-mixing machine of the tilting drum type exemplifying certain features of the invention;

Figure 2 is a partly cut-away view taken from the other side of the machine of Figure 1, showing particularly the mounting of the hopper and the mechanism for raising it;

Figures 3 and 4 are detail views, to a larger scale, showing part of the hopper mounting;

Figures 5 and 6 are greatly enlarged detail views showing two different operating positions thereof of elements employed in the apparatus of Figures 1 and 2;

Figures 7, 8 and 9 are diagrammatic views illustrating the operation of the hopper raising mechanism and also showing details of the weighing mechanism;

Figure 10:
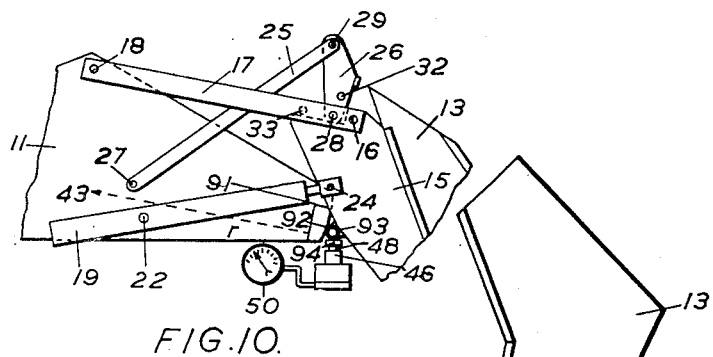
Figure 10 is a diagrammatic detail view illustrating a modification.

Referring firstly to Figures 1 to 9, a concrete-mixing machine of the tilting drum type is shown. This mechanism comprises a framework 1 which is mounted on wheels 2. These wheels support the machine on the ground level of which is indicated at G. At one end of the frame 1 two pillar members 3 are provided on opposite sides of the frame and those pillar members support between them a rotary mixing drum 4. This drum is rotatably mounted in a U-shaped cradle 5 and is arranged to be rotated about its longitudinal axis in the usual way by means of a bevel gear (not shown) meshing with a gear ring 6 surrounding the drum. The drive to the bevel gear is taken from a suitable source of power, such as an internal combustion engine indicated at 7, through a driving connection which may include a belt 8. The arms of the cradle 5 on opposite sides of the drum 4 are secured to stub shafts 9 and 10 which are journalled in bearings provided in the upper ends of the pillar members 3.

Mechanism, which will be described in due course, is provided for tilting the cradle and drum in order to move the latter from its filling position, in which its mouth faces the loading apparatus as shown in Figure 8, to its emptying position in which its mouth is directed downwardly and away from the loading apparatus at the opposite end of the machine.

Rigidly secured to the frame 1 is a hopper-supporting structure 11 which may consist of a pair of parallel plates which are suitably secured to the frame 1 and to each other. The frame 1 also supports a water feed apparatus, indicated generally at 12, in addition to the engine 7. The water feed apparatus may be of any appropriate type.

In the present machine the raising of the hopper and the tilting of the mixing drum are effected hydraulically, as will appear in due course, and suitable hydraulic supply and control apparatus is provided for this purpose. This apparatus, which may be of any suitable type and which is not shown in the drawings, preferably includes an oil reservoir, an oil pump driven by the engine 7 and the appropriate control and pressure relief valves.

The hopper, which is indicated at 13, is of elongated form having a main hopper portion at one end and a discharge mouth 14 at its other end. The hopper, which may be of conventional construction, is rigidly attached to a cradle 15 which forms part of the hopper structure.

The cradle 15 is pivotally attached at 16 to the outer end of a radius arm 17, the inner end of which is pivotally connected at 18 to the structure 11. The radius arm 17 may be of any suitable construction and in the present embodiment it consists of two parallel members which are connected together at suitable points to form a rigid unit.

For raising and lowering the hopper 13 a ram 19 is provided. The cylinder 20 of this ram is mounted in a bracket 21 which is connected with the structure 11 for pivotal movement about the point 22. The piston rod 23 of the ram is pivotally connected at 24 to the cradle 15. The construction and mounting of the ram 19, which is of the single-acting type, will be described in greater detail in due course.

When oil under pressure from the hydraulic supply system is admitted to the cylinder 20 of the ram 19 the piston 23 produces an upward force on the hopper having a turning moment about both the connections 16 and 18. This turning moment overcomes the downward turning moment due to the weight of the hopper assembly which includes the hopper itself, the load and that proportion of the weight of the linkage and of the associated parts which is transmitted to the hopper; the downward turning moment also acts about the points 16 and 18.

The various parts are so dimensioned and arranged that the action of the ram during the raising of the loaded hopper tends to rotate the hopper about the point 18 rather than the point 16. It can be proved that this condition is fulfilled if the point of intersection of the line of action of the ram 19 and the axis of the radius arm 17 lie inside a perpendicular line drawn through the centre of gravity of the hopper assembly. Thus, referring to Figure 7, if W indicates the centre of gravity of the hopper assembly, including the load, and if P is the point of intersection of the lines drawn through the axes of the ram 19 and of the radius arm 17, then the point P should lie inside the perpendicular W—X drawn through the point W. This condition should apply for all positions of the radius arm and hopper until they reach the positions shown in Figure 8, and if so the result will be that the hopper and radius arm will pivot as a whole about the point 18 until the radius arm reaches the limit of its upward movement.

The position of the point W will of course depend on whether the hopper is loaded or empty and on the precise distribution of the load in the hopper. It has been found that there are practical difficulties in keeping the position of the point P always inside the perpendicular through the centre of gravity when the hopper is empty, but as will appear hereinafter, this is not a serious matter providing that the required conditions are obtained when the hopper is heavily loaded.

During normal working of the machine the hopper will always be loaded with a complete batch of the materials which are to be mixed and this batch will normally be substantially equal to the nominal mixing capacity of the drum. This capacity is defined in British Standards Specification No. 1305 of 1946 which also specifies that the capacity of the hopper should be 50 per cent greater than the nominal capacity of the drum. For practical purposes therefore it may be considered that the required result will be obtained providing that the point P lies inside the perpendicular line W—X when the hopper contains not less than 60 per cent of the material representing the nominal mixing capacity of the drum, providing that the distribution of this material in the hopper is such that the position of the centre of gravity is no nearer to the frame of the machine than would be obtained by the ordinary loading under practical conditions of sand, ballast or like material into the hopper, for example by tipping from a vehicle or by hand loading.

Providing that the above conditions are fulfilled it will be ensured that, during the normal use of the machine, when the hopper is raised by the action of the ram 19 the hopper and the radius arm will first pivot as a whole about the point 18.

The upward movement of the arm 17 is limited by the action of a pair of pivotally-connected link members 25 and 26. The link 25 is pivoted at 27 to the structure 11, while the link 26 is pivoted at the point 28 to the radius arm 17. The links are pivoted to each other at 29.

Figure 9:
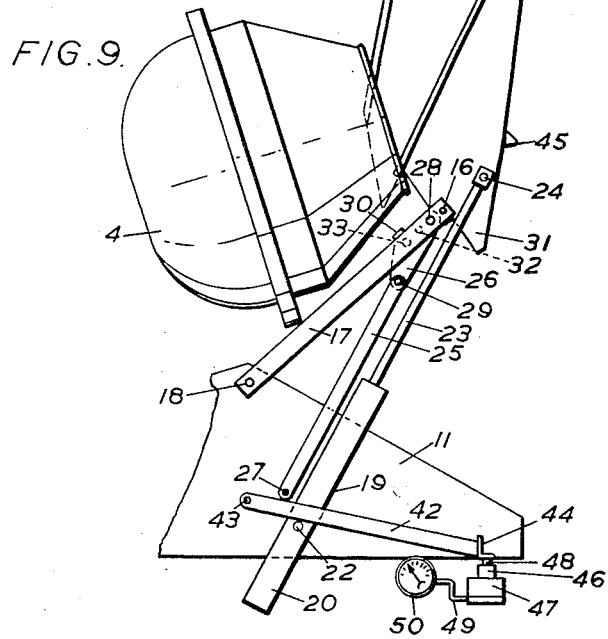

When the links 25 and 26 have reached their in-line dead-centre position as shown in Figure 8 the continued action of the ram 19 will have the effect of tilting the hopper 13 about the point 16 as shown in Figure 9, thus discharging the contents of the hopper into the drum 4.

Oil is then allowed to escape from the ram to permit the hopper to descend. The arrangement of the links 25 and 26 is such that as soon as the hopper begins to move downwardly the links drop down past their in-line dead-centre position by a small amount which is limited by the engagement of a cross bar 30 provided on the link 26 against the upper surface of the arm 17. Consequently during the first part of the downward movement of the hopper the links 25 and 26 form with the arm 17 a fixed pivotal support for the cradle 15 and hopper 13. Thus the hopper swings down about the point 16 until it reaches the position shown in Figure 8.

In order to break the articulated connection provided by the links 25 and 26 when the hopper reaches this position so that the arm 17 can start to pivot about the point 18, the toe 31 of the cradle 15 is arranged to engage an element, such as a pin 32, provided on the link 26 in order to turn the links past their dead-centre position. Thereafter the radius arm 17, cradle 15 and hopper 13 descend as a whole while pivoting about the point 18. It will be noted that the hopper is prevented from turning relatively to the arm 17 about the point 16 beyond the position shown in Figures 7 and 8 by the engagement of the toe 31 against a pin or stop 33 provided on the arm 17.

With the appropriate arrangement and dimensioning of the various parts as described above, bearing in mind the intended loading of the hopper and the distribution of the load in the latter, the apparatus can be so constructed that it will operate in the desired manner. That is, the hopper will be raised and lowered in two distinct stages, the movement during the lower stage being effected about the point 18 and the movement during the upper stage being effected about the pivot 16. In order to ensure this correct operation, however, the stated condition must be fulfilled that the point P must remain inside the perpendicular W—X. Should the point P move outside this perpendicular there is a risk of instability occurring and of the hopper pivoting prematurely about the point 16. This might occur if the hopper were raised while empty.

In order to avoid any risk of instability or incorrect operation of the apparatus in such circumstances, interlocking mechanism is provided between the link 26 and the hopper cradle 15. This mechanism is arranged to ensure that it is only when the radius arm 17 is in its upper position with the links 25 and 26 fully extended that the hopper and cradle can pivot about the point 16.

The interlocking mechanism comprises two cams 34 and 35 (see Figures 5 and 6). The cam 34 is attached to the cradle 15, for which purpose it is provided with a shank part 36 which is bolted to a web or flange 37 forming part of the cradle structure, while the cam 35 is secured by welding or otherwise to the link 26.

The cam 34 has an outer circumferential surface 38 which is concentric with the axis 16 of the connection between the cradle 15 and the radius arm 17; this surface terminates in a rounded nose 39. Similarly the cam 35 has a circumferential surface 40, which is concentric with the axis 28 of the connection of the link 26 with the arm 17, and this surface terminates in a rounded nose 41.

The arrangement of the parts is such that until the link 26 reaches the angular position relatively to the radius arm 17 which corresponds to the upper position of the arm the hose 39 of the cam 34 bears on the circumferential surface 40 of the cam 35 (see Figure 5), thus preventing any pivoting of the cradle and hopper relatively to the arm 17. When, however, the arm 17 reaches its upper position with the link 26 in the position relatively to it which is shown in Figure 6 the nose 39 of the cam 34 can move past the nose 41 of the cam 35, thus allowing the former cam and with it the cradle and hopper to rotate about the axis 16.

Once the cam 34 has started to rotate its circumferential surface 38 moves in front of the nose 41 of the cam 35 and thus prevents any movement of the link 26 relatively to the arm 17. This provides a safety device which prevents the articulated link assembly 25, 26 from being broken, which might allow the arm 17 to drop prematurely.

It should be noted that during normal working of the machine the cams 34 and 35 are only needed when the hopper is descending or if it should be raised while it is empty or only lightly loaded. Under these conditions of light loads the stresses on the cams are proportionately small. When the hopper is fully loaded the cams are not subjected to any stresses.

The weighing mechanism will now be described. This mechanism comprises in essentials a weighing element adapted to be operated directly or indirectly by the hopper when the latter is in its lower position, a weight-indicating device operated by the weighing element and guide means which are effective, in conjunction with the connection provided by the arm 17, when the hopper is in its lower position for guiding and controlling the movement of the hopper while it is operating the weighing element.

The guide means in this construction comprise a guide arm 42, one end of which is pivoted to the structure 11 at a point 43 which is located below the point 18. The other end of the arm 42 is shaped at 44 to provide a transverse V-groove which is adapted, when the hopper descends, to receive a knife-edge element 45 which is provided on the lower part of the cradle 15. The length of the guide arm 42 between the point 43 and the V-groove 44 is made equal to the length of the radius arm 17 between the points 18 and 16, while the distance between the points 18 and 43 is made equal to the distance between the point 16 and the knife edge 45. It will thus be seen that, when the knife edge 45 is in engagement with the groove 44 in the guide arm, the two arms 17 and 42 form a parallel linkage which ensures that all parts of the hopper are constrained to move through equal distances along parallel arcuate paths. Consequently, for any given load in the hopper the vertical component of the pressure exerted on the end of the guide arm 42 is independent of the distribution of the load in the hopper.

The weighing element and the weight indicating device may be of many different kinds but in the present construction the weighing element takes the form of a hydraulic cylinder 46 which is mounted on a fixed support 47 and which contains a piston 48. The arm 42 rests on the end of the piston rod and thus transmits the weight of the hopper and its load to the piston.

The bottom of the cylinder 46 is connected by means of a pipe 49 to a pressure gauge 50. The system is filled with oil which thus transmits the pressure exerted by the piston to the pressure gauge. The dial of the latter is calibrated to indicate the weight of the load in the hopper.

It may be noted here that when the pressure in the ram 19 is relieved and the hopper is supported by the knife edge 45 resting in the V-groove 44 of the arm 42, which in turn rests on the piston 48, there are no other external forces acting on the hopper which have a resultant vertical component which would interfere with the accuracy of the weighing, other than those caused by friction at the various joints and between the arm 42 and the piston 48 and the friction in the ram itself. Apart from such frictional forces, which can be kept small, the reaction forces in the arms 17 and 42 are equal and opposite and have no resultant vertical component, irrespective of the distribution of the load in the hopper 13.

The apparatus may be so constructed that the hopper, after emptying its contents into the mixing drum 4, automatically descends upon the pressure of the fluid in the ram 19 being released. With certain constructions, however, it may happen that the hopper when in its upper position is so near to, or is even beyond, its dead centre position that some means must be provided for initiating the downward movement of the hopper. Such means may comprise a spring which is stressed when the hopper approaches its upper position but which, by reasserting itself, assists in initiating the downward movement of the hopper. It is preferred to make use of a compression spring which is located within the ram cylinder for this purpose.

A problem which arises in connection with hydraulic and like rams which comprise a piston and cylinder operating between two relatively movable parts is to ensure that the connections with these parts are so constructed as to permit of slight lateral movements which may be necessary during working. Figures 3 and 4 illustrate a preferred construction of a ram and ram mounting which provide for this.

The ram comprises the ram cylinder 20 one end of which is closed by means of a plate 50 provided with a fluid inlet connection 51 and the other end of which is provided with a cap 52 which is formed with a central opening in which the tubular piston rod 23 is slidable. At its inner end the piston rod 23 is provided with a head 53 which is a good sliding fit in the cylinder 20 and which carries an inwardly-facing cup leather 54. This cup leather is clamped in position by means of a disc 55 which is secured to the piston rod by means of screwed studs 56.

The cylinder 20 is pivotally mounted intermediate its ends on the frame of the machine. This connection is effected by means of the cradle or bracket member 21 which is provided at its opposite ends with short shafts 57 which are journalled in suitable bearings provided in the structure 11. The cylinder 20 passes through the bracket 21 with a certain amount of clearance on all sides.

The cylinder 20 is provided with an annular flange 58 which is attached to the cylinder 20 by welding or otherwise. This flange 58 is formed at diametrically opposite points with two openings 59 through which pass bolts 60 which are fitted in corresponding holes formed in the bracket 21. The dimensions of the openings 59 in the flange 58 are such that there is no direct contact between the bolts 60 and the flange.

The faces 61 and 62 of the flange and of the bracket are spaced from each other by means of two diametrically opposed ribs 63 which are provided on the flange in line with the line joining the bolt openings 59. This line is perpendicular to the axis of the shafts 57. The ribs themselves bear against the face 62 of the bracket 21.

On the side of the flange 58 opposite the bracket the bolts 60 are provided with rubber or other resilient washers 64 which are compressed between the outer face of the flange 58 and metal washers 65 which are retained in position on the bolts by means of nuts 66.

It will be apparent that during the operation of the machine the normal tilting of the cylinder 20 is permitted by the pivoting of the bracket 21 about the axis of the shafts 57. Should, however, there be any lateral movement of the hopper, due for example to play between the different parts, which would require that the ram cylinder should tilt angularly with respect to the axis of the shafts 57, this angular movement is rendered possible by the movement between the bracket 21 and the flange 58 about the line joining the ribs 63, this movement being permitted as a result of the resiliency of the washers 64. In this way any risk of the ram piston seizing in the cylinder or of the various parts being unduly strained is minimised.

To ensure that the desired results are fully achieved it is desirable that the connection between the piston rod 23 and the cradle 15 of the hopper should also permit of lateral angular movement of the piston rod of a similar nature and a suitable connection to allow of this is accordingly provided.

This connection comprises a bracket member 67 which is provided with bearings 68 at its opposite ends to receive a pivot pin (not shown in Figures 3 and 4) connecting it with the hopper. This bracket 67 is provided with a front plate 69 which is welded in position and which is formed with a central hole 70 through which a stud 71 projecting from an attached to the end of the piston rod 23 can pass with clearances on all sides. The front plate 69 is formed on its outer side with two diametrically opposed ribs 72 the common axis of which is at right angles to the pivotal axis of the bracket. These ribs 72 bear against the face of a cap member 73 which is provided on the end of the piston rod 23 and which carries the aforesaid stud 71.

On the opposite side of the front plate 69 within the bracket 67 a resilient washer or buffer 74 is provided which surrounds the stud 71 and is clamped in position between plate 69 and a metal washer 75 which is secured to the stud by means of a nut 76 screwed on the threaded end of the latter.

It will be apparent that the above form of connection provides for a limited transverse angular movement of the piston with respect to the bracket 67, this movement occuring about the line joining the ribs 72.

It is important to notice that both in the connection between the ram cylinder 20 and the structure 11 and in the connection between the piston rod 23 and the hopper cradle 15 the parts are so arranged that the loads due to the weight of the hopper are transmitted by direct metallic connections, firstly between the ribs 72 on the face plate 69 of the bracket 67 and the cap 73 on the end of the piston rod 23 and, secondly, between the ribs 63 on the cylinder flange 58 and the face of the bracket 21. The resilient washers serve to retain the parts in their correct positions without undue rattle or play while they also reduce the shocks produced when the hopper reaches the limit of its travel.

As has been stated when a return spring for the hopper is necessary it is preferred to provide it within the ram cylinder. Such a spring is shown as a helical compression spring 77 which is fitted round the piston rod 23 within the cylinder 20. As the piston rod approaches its outermost position, corresponding to the upper position of the hopper, the spring is subjected to a compression force between the piston head 53 and a sleeve 78 fitted in the end of the cylinder against the cap 52 and is thereby compressed. It is retained compressed as long as the hopper is held in its upper position by the pressure of the fluid in the cylinder. When, however, this pressure is relieved the spring reasserts itself to initiate the return movement of the piston and the downward movement of the hopper.

As shown, a resilient washer 79 backed by a metal washer 80 may be provided surrounding the end of the piston rod behind the cap 73 in a position to engage the cap 52 on the end of the cylinder when the piston reaches its fully retracted position. This washer 79 provides a resilient buffer.

The mechanism for tilting the mixing drum 4 will now be described with particular reference to Figure 1. This mechanism comprises a double-acting hydraulic ram 81 which is supplied with pressure oil from the previously mentioned hydraulic supply system under the control of suitable valves.

The cylinder of the ram 81 is pivotally connected at 82 to one of the pillar members 3, while the piston rod 83 of the ram is connected at 84 to a main crank 85. This crank 85 is pivotally-mounted at 86 on a bracket 87 projecting from the member 3, the axis of the crank being offset to one side of the stub shaft 10.

A secondary crank 88 is secured to the end of the shaft 10 and is connected with the main crank by means of a link 89. It will be noted that the main crank 85 is longer than the secondary crank 88.

The distance between the lower end of the link 89 and the axis 86 of the main crank 85 is greater than the distance between the axis 86 of the crank 85 and the stub shaft 10, which is the axis of the secondary crank, so that when the crank 85 moves upwardly the path of the movement of the point of connection of the link 89 with it lies on the side of the shaft 10 opposite to the axis 86 of the crank 85.

The geometry of the mechanism is such that when the main crank 85 is drawn down by the action of the ram 81 the secondary crank 88 is also turned downwardly in the same direction, thus tilting the drum 4 towards its emptying position, whereas when the main crank 85 moves up the secondary crank 88 and with it the drum are rotated in the opposite direction towards the charging position of the drum through an angle which is greater than the angle through which the main crank is turned. The secondary crank and with it the mixing drum 4 can in fact easily be turned through an angle rather greater than 180° for a movement of the main crank of less than 90°. This is rendered possible by the fact that the rotation of the main crank 85 causes its point of connection with the link 89 to travel round the axis of the shaft 10 in the same direction as the rotation of the latter.

The drum tilting mechanism may be controlled by any suitable control apparatus which may include a follow-up element which requires to be operated in accordance with the tilting of the drum. The mechanism described may, therefore, be provided with means for coupling the movement of the drum 4 with such a follow-up element. This may conveniently include a crank which is mounted on the shaft 86 which carries the crank 85 and which is connected with the follow-up element by means of a suitable linkage.

Figure 10 shows a modified form of guide mechanism which may be used in place of the guide arm 42.

The parts of the apparatus shown in this figure include the supporting structure 11, the hopper 13 with its cradle 15, the radius arm 17, which is connected to the structure 11 at the point 18 and to the cradle 15 at the point 16, the ram 19, which is connected to the structure 11 at the point 22 and to the cradle 15 at the point 24, and the links 25 and 26 the point of connection of which are indicated at 27, 28 and 29, all of which parts are the same as those shown in Figures 1 to 9. The apparatus also comprises the weighing cylinder 46 with its piston 48 and pressure gauge 50.

In place, however, of the guide arm 42 a fixed guide cam 91 is provided secured to the structure 11. The outer face 92 of the cam 91 is of arcuate form having a radius of curvature $r$. The centre of curvature of the face 92 is at the point 43 which was the point of connection of the guide arm 42 to the structure 11 in the previous construction.

In place of the knife edge 45 the cradle 15 is provided with an anti-friction roller 93 which bears against the face 92 when the hopper is in its lower position. The same roller 93 (or preferably a second independent roller) bears on the head 94 of the piston 48 and in this way the weight of the hopper is transmitted directly to this piston.

The radius $r$ plus the radius of the roller 93 together equal the length of the arm 17 between the points 18 and 16. Consequently it will be seen that during the weighing operation the hopper is guided in a manner similar to that described in connection with the previous construction.

The methods of mounting and guiding the hopper 13 utilising the radius arm 17 which have been described are particularly intended for machines of the so-called "high discharge" type in which the hopper has to be raised through a considerable distance. Apparatus working on the same principle could however be used in machines in which only a moderate lift is required, since clearly the same principles apply irrespective of the length of the connecting arm 17 and the amount of movement permitted to it. If desired, this arm could be made quite short and could be arranged to make only quite a small angular movement during the raising of the hopper.

Figure 11:
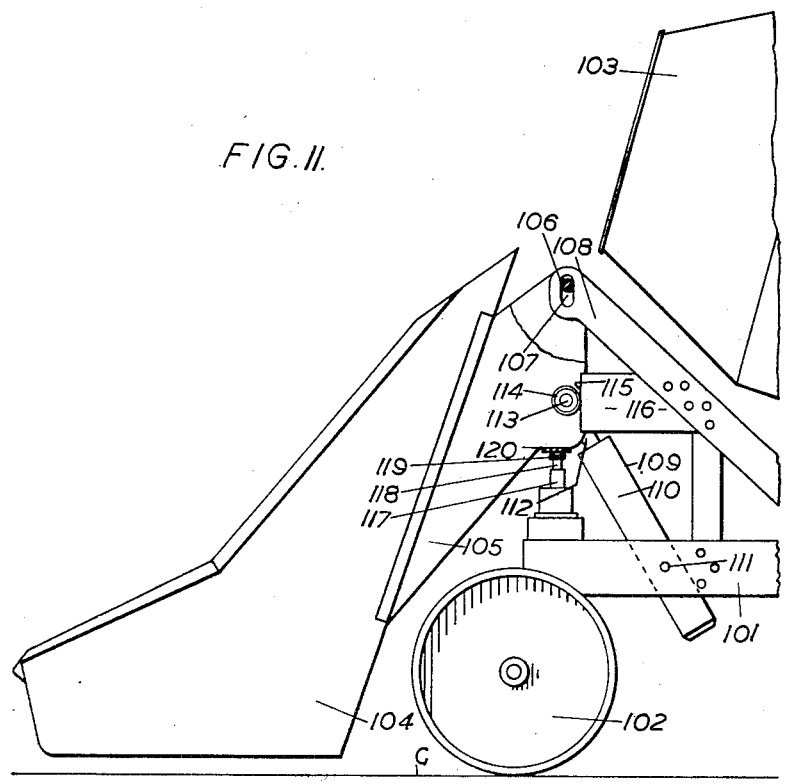
Figs. 11 and 12 are views somewhat similar to Fig. 7 illustrating further modifications of the present invention.
Figure 12:
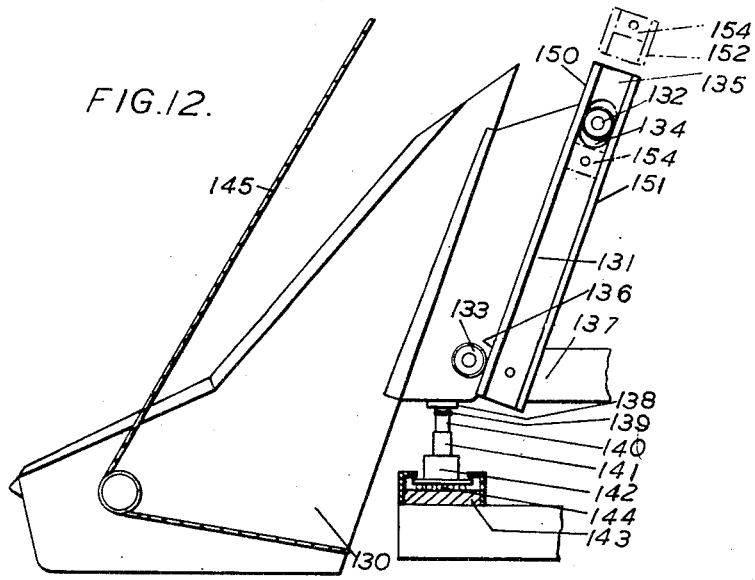

It is not, however, necessary to make use of a pivoted connecting arm, such as the arm 17, and Figures 11 and 12 show two alternative forms of construction.

In Figure 11 the frame of a mixing machine is indicated at 101, this frame being mounted on wheels 102. A mixing drum of the tilting type is shown at 103 while the hopper for loading material into it is indicated at 104. The hopper includes a cradle part 105 which is rigidly connected with it as in the previous constructions.

The cradle 105 is connected with the frame of the machine for pivotal and limited linear movement by means of a pair of pins 106 which engage in vertical slots 107 formed in members 108 which are rigid parts of the frame of the machine.

For raising the hopper a hydraulic ram 109 is provided, the cylinder 110 of which is pivotally connected with the frame 101 at the point 111 and the piston 112 of which is connected with the cradle 105 by means of a cross-pin 113. This pin 113 also carries a roller (or preferably a pair of rollers) 114 which engages against the vertical face 115 of a guide member or members 116 fixedly mounted on the frame 101. The plane of the face 115 and the axis of the slot 107 are vertical and therefore parallel to each other.

For indicating the weight of the load in the hopper a weighing element is provided which may again take the form of a hydraulic cylinder 117 which is connected to a suitable pressure gauge (not shown). The piston 118 of the cylinder 117 has a head 119 which is engaged by a plate 120 on the cradle 105 when the hopper is in its lower position. It should be noted that the full movement of the hopper and cradle necessary to operate the weighing device is permitted by the movement of the pins 106 in the slots 107 without these pins engaging the ends of the slots. Consequently, during the weighing operation there are no vertical forces acting on the hopper, apart from the weight of the hopper and of its load and the reaction force of the piston 118 and apart from forces due to the friction of the pins 106 in the slots 107 and the friction of the rollers 114. These frictional forces may be kept to a low value by suitable design (for example the pins 106 may be replaced by antifriction rollers) and any errors produced in the weighing as a result of them will then be negligible.

Apart from these errors the apparatus will indicate the correct weight of the load in the hopper irrespective of the distribution of this load owing to the manner in which the hopper is constrained for parallel movement during the weighing operation.

To raise the hopper, fluid under pressure is admitted to the ram cylinder 110. This produces an upward and outward force on the hopper and cradle having a turning moment about the pins 106.

With the construction shown the first movement of the hopper will be vertical until the pins reach the upper ends of the slots 107, after which the rollers 114 will leave the guide members 116 and the hopper will turn about the pins 106 to raise the load and to discharge it into the drum 103.

At a certain point in the travel of the hopper the pins 106 will drop down in the slots 107. If desired it may be arranged that this occurs when the hopper nears its upper position and the resulting jolt will assist in the discharge of the material from the hopper into the drum.

At some point during the downward movement of the hopper the pins 106 will return to the upper ends of the slots 107, this occurring before the hopper reaches the position for the plate 120 to engage the piston head 119.

Figure 12 illustrates a modification of the apparatus shown in Figure 11, in which the hopper is raised by means of a cable and in which the movement of the hopper during the weighing operation takes place at an angle to the vertical.

The hopper 130 is provided with a cradle 131 and this cradle carries two pairs of antifriction rollers 132 and 133. The rollers 132 engage in slots 134 formed in members 135 of channel section, which members form part of or are attached to the frame of the machine. The rollers 133 run on the side surfaces 136 of the member 135. The longitudinal axes of the slots 134 are parallel to the lengths of the members 135 and to the plane of the surfaces 136, the members 135 being inclined to the vertical at an acute angle as shown.

The cradle 131 is provided with a plate 138 which bears on the head 139 of a piston 140 working in a cylinder 141. The cylinder 141, which is connected to a pressure gauge, is mounted on a base 142.

Owing to the fact that in this construction the hopper will have a horizontal component of motion relatively to the frame of the machine during the weighing operation, antifriction means are preferably provided for reducing the friction produced by the operation of the weighing element. In the construction shown the base 142 is shown as being movably mounted on a member 143, which is part of the frame of the machine, by means including ball bearings or antifriction rollers which are indicated diagrammatically at 144. As soon as the plate 138 begins to operate the piston 140 of the weighing element the piston 140 and cylinder 141 will move horizontally in accordance with the horizontal component of the movement of the hopper, without there being any relative movement between the plate 138 and the piston head 139.

An equivalent result could of course be obtained by providing an antifriction device between the plate 138 and the head 139.

The hopper 130 is raised and lowered by means of a cable 145 which may be operated by any suitable raising mechanism of a conventional type (not shown). The operation of the hopper will be similar to that described with reference to Figure 11. Thus, during the raising of the hopper the rollers 132 will first move to the upper ends of the slots 134, after which they will drop to the bottoms of the slots as the hopper nears its upper or discharge position. Alternatively the amount of the tilt of the hopper may be limited so that the rollers 132 remain at the upper ends of the slots 134 during the tilting of the hopper.

The construction of Figure 12 could also be applied to loading apparatus of the extended runway type in which the hopper is arranged to travel up a runway and to be tipped when it reaches the top of the runway. Such an arrangement is indicated in broken lines in the drawing.

In this extended-runway modification the slots 134 are omitted and the rollers 132 are arranged to run between the flanges 150 and 151 of the channel members 135. Furthermore these members are extended as shown at 152 so as to provide a runway of the required length.

Lower stops 153 fitted in the members 135 limit the downward movement of the rollers 132, while similar stops 154 limit their upward movement.

When the cable 145 is operated it first draws the hopper up the runway until the rollers 132 engage the stops 154, after which the hopper tilts to discharge its contents into the mixing drum (not shown). Means are provided to limit this tilt to an amount which is not sufficient to cause the rollers 132 to leave the stops 154. When the cable 145 is allowed to run out the hopper first tips back to its previous position in which the rollers 133 engage the members 135, after which the hopper runs back down the runway to the position shown in the drawing in which it operates the weighing mechanism.

When using a hydraulic cylinder and piston as the weighing element there is a risk of some of the fluid leaking past the piston into the upper part of the cylinder during the weighing operation. It is desirable, therefore, to provide means for returning this fluid to the cylinder below the piston during the time that the piston is not under load. This may be done by providing a passage which connects the upper and lower parts of the cylinder and which is controlled by a non-return valve permitting only the downward flow of the fluid; and by providing a spring for urging the piston upwardly so that when the piston is not loaded it is forced towards the top of the cylinder so that any fluid trapped in the upper part of the latter is forced through the passage and non-return valve into the lower part of the cylinder below the piston. The strength of the spring need be little more than is necessary to overcome the weight of the piston (and of the guide arm if one is used) and any slight effect which the spring may have on the accuracy of the weighing can be allowed for when calibrating the pressure gauge. The aforesaid passage can conveniently be formed through the piston itself.

While there have been illustrated and described several embodiments of the present invention, it should be understood that the present invention is not limited to the specific details of construction and arrangement thereof herein illustrated, and modifications may occur to one skilled in the art without departing from the spirit of the present invention. It is intended in the present claims to cover all such changes and modifications as fall within the true spirit and scope of the present invention.

I claim:

1. In a mixing machine having a mixing drum, apparatus for loading material into the drum comprising a supporting structure, a hopper, said hopper including a body portion adapted to contain material to be loaded into said drum, and a cradle portion rigidly connected with said body portion and extending from said body portion toward said supporting structure, connecting means for connecting the hopper with said structure for movement between a lower loading position and an upper discharge position, means for raising the hopper from its lower position to its upper position and for tilting it to discharge its contents into the mixing drum and weighing mechanism for indicating the weight of the contents of the hopper, said weighing mechanism comprising a weighing element spaced from said body portion of said hopper and engageable by the cradle portion of said hopper, said weighing element being adapted to be operated by the movement of the hopper when said hopper is in its said lower position, a weight-indicating device responsive to the force exerted on the weighing element due to the weight of the hopper and its contents and guide means for guiding said hopper for parallel movement effective in conjunction with the said connecting means when the hopper is in its said lower position during which parallel movement all parts of the hopper are constrained to move through substantially equal distances along substantially parallel paths while operating the weighing element.

2. In a mixing machine, loading apparatus according to claim 1 wherein the said means connecting the hopper with the supporting structure comprise a radius arm which is pivotally connected at one end to the said structure and which is pivotally connected at its other end to the hopper and wherein the said guide means act on the hopper at a point spaced from the point of connection of the radius arm to the hopper whereby the said points are constrained to move along substantially parallel arcuate paths during the operation of the weighing element.

3. In a mixing machine, loading apparatus according to claim 2 wherein the said guide means comprise a fixed cam surface and an element which is mounted on the hopper in a position to engage the said cam surface.

4. In a mixing machine, loading apparatus according to claim 1 wherein the hopper is connected with the supporting structure by means comprising a radius arm which is pivoted at one end to the structure and at the other end to the hopper and wherein the said guide means comprise a guide arm which is pivotally connected at one end with the guide structure and which is operatively connected at its other end with the hopper when the latter is in its lower position operating the weighing element, the said radius and guide arms then being substantially parallel to each other and of equal effective length.

5. In a mixing machine, loading apparatus according to claim 4 wherein the guide arm engages and is supported by the weighing element and is itself engaged by the hopper when the latter reaches its lower position.

6. Apparatus for loading material into a mixing machine of the type comprising a mixing drum with means for operating said drum to mix materials therein and for discharging materials when properly mixed; said apparatus comprising a supporting structure, a radius arm pivoted to said structure, a hopper pivoted to said arm, a pair of pivotally-connected links one of which is pivoted to said structure and the other of which is pivoted to said radius arm, means limiting the downward movement of the links past their in-line dead-centre position after said radius arm has reached its upper position and means for returning said links past the said dead-centre position when said hopper reaches a predetermined position relatively to the radius arm to allow said arm to descend.

7. Apparatus according to claim 6 wherein interlocking means are provided for positively preventing pivoting of the hopper relatively to the radius arm except when the said arm is in its upper position.

8. Apparatus according to claim 7 wherein the said interlocking means comprise a pair of interengaging cams one of which cams is connected with one of the said links adjacent the point of connection of the latter with the radius arm and the other of which cams is connected with the hopper adjacent to the point of connection of the hopper with the radius arm.

9. Apparatus according to claim 6 wherein there is included a weighing element responsive to the weight of the hopper and its load when said hopper is in its lower position, indicating means actuated by said weighing element for indicating the weight of the load in the hopper and guide means effective in conjunction with the radius arm for guiding said hopper for parallel movement during which all parts of the hopper are constrained to move through substantially equal distances along substantially parallel paths while operating the weighing element.

10. Apparatus according to claim 9 wherein the guide means comprise a guide arm which is pivotally connected at one end with the supporting structure and which is operatively connected at its other end with the hopper when the latter is in its lower position operating the weighing element, the said radius and guide arms then being substantially parallel to each other and of equal effective length.

11. Apparatus according to claim 9 wherein the guide means comprise a fixed cam surface provided on the said structure and an element mounted on said hopper in a position to engage the cam surface.

12. Apparatus for loading material into a mixing machine of the type comprising a mixing drum with means for operating said drum to mix materials therein and for discharging materials when properly mixed, said apparatus comprising a supporting structure, a hopper, means connecting the hopper with the supporting structure for movement between a lower filling position and an upper position in which the hopper is tilted to discharge the materials in it into the drum and a hydraulic ram connected between the structure and the hopper for raising and tilting the latter and wherein the ram is connected with the supporting structure by means comprising a first member which is pivotally mounted on the structure to permit of the normal pivotal movement required by the operation of the ram, a second member connected with the ram, a pair of diametrically-opposed elements interposed between adjacent faces of the said members and means including a resilient buffer urging said members towards each other while permitting limited angular movement between them, the line joining the said elements being transverse to the axis of the pivotal connection between the first member and the structure.

13. Apparatus for loading material into a mixing machine of the type comprising a mixing drum with means for operating said drum to mix materials therein and for discharging materials when properly mixed, said apparatus comprising a supporting structure, a hopper, means connecting the hopper with the supporting structure for movement between a lower filling position and an upper position in which the hopper is tilted to discharge the materials in it into the drum and a hydraulic ram connected between the structure and the hopper for raising and tilting the latter and wherein the ram is connected with the hopper by means comprising a first member which is pivotally connected with the hopper to permit of the normal pivotal movement produced by the movements of the ram and the hopper, a second member connected with the ram, a pair of diametrically-opposed elements interposed between adjacent faces of the said members and means including a resilient buffer urging said members towards each other while permitting limited angular movement between them, the line joining the said elements being transverse to the axis of the pivotal connection between the first member and the hopper.

14. Apparatus for loading material into a receptacle comprising a supporting structure, a hopper including a body portion adapted to contain material to be loaded into said receptacle, and a cradle portion rigidly connected to said body portion but extending from said body portion toward said supporting structure, connecting means for connecting said cradle portion with said supporting structure for movement between a lower loading position of said hopper and an upper discharge position thereof, means for raising said hopper from its lower position to its upper position, and for tilting it to discharge its contents into said receptacle, and weighing mechanism for indicating the weight of the contents of said hopper, said weighing mechanism comprising a weighing element spaced from the body portion of said hopper and operated by the cradle portion thereof, said weighing element adapted to be operated by the movement of said hopper when the latter is in its lower position, a weight indicating device responsive to the force exerted on the weighing element due to the weight of the hopper and its contents transmitted through said cradle portion, and guide means for guiding said hopper for parallel movement effective in conjunction with said connecting means when said hopper is in its lower position to guide the hopper during such parallel movement so that all parts of said hopper are constrained to go through substantially equal distances along substantially parallel paths while operating the weighing element, whereby the weight indicated by the weight indicating device is rendered substantially independent of the distribution of the load in the hopper.

15. Apparatus according to claim 14, wherein the means connecting the hopper with the supporting structure comprise a radius arm which is pivotally connected at one end to the structure and at the other end to the hopper and wherein the guide means act on the hopper at a point spaced from the point of connection of the radius arm to the hopper whereby the said points are constrained to move along substantially parallel arcuate paths during the operation of the weighing element.

16. Apparatus according to claim 15, wherein the guide means comprise a fixed cam surface and an element which is mounted on the hopper in a position to engage the cam surface.

17. Apparatus according to claim 14, wherein the hopper is connected with the supporting structure by means of a radius arm which is pivoted at one end to the structure and at the other end to the hopper and wherein the guide means comprise a guide arm which is pivotally connected at one end with the supporting structure and which is operatively connected at its other end with the hopper when the latter is in its lower position operating the weighing element, the said radius and guide arms then being substantially parallel to each other and of equal effective length.

18. Apparatus according to claim 14 wherein the raising means is connected with the hopper and is effective to raise the hopper and the radius arm together about the point of connection of the radius arm with the supporting structure until the limit of the upward movement of the radius arm is reached, whereafter the radius arm remains stationary and the hopper is tilted by the action of the raising means about the point of connection of the hopper with the radius arm.

19. Apparatus according to claim 18, wherein means are provided for preventing the radius arm for moving downwardly from its uppermost position until after the hopper has completed its downward pivotal movement about its point of connection with the radius arm.

20. Apparatus according to claim 19, wherein the upward movement of the radius arm is limited by a pair of pivotally connected links one of which is connected to the supporting structure and the other of which is connected to the radius arm, which links are in their in-line dead-centre position when the radius arm is at the upward limit at its movement and are effective to prevent the downward movement of the radius arm until the hopper has completed its downward pivotal movement about its point of connection with the radius arm, at which time the hopper actuates the links to move them past their dead-centre position, thus allowing the radius arm to descend.

21. Apparatus according to claim 14 wherein the means connecting the hopper with the supporting structure comprise a pair of connecting members one mounted on the hopper and one mounted on the supporting structure, which members are connected with each other so as to permit of limited linear movement of the first member relatively to the second member, wherein the guide means comprise a pair of guide members which are mounted one on the hopper and one on the supporting structure and which are so arranged that the first guide member engages the second guide member when the hopper reaches its lower position, after which the first guide member can move relatively to the second guide member during the operation of the weighing device along a path which is parallel to that of the movement of the first connecting member.

22. Apparatus according to claim 21, wherein one of the connecting members comprises an element which engages in a slot formed in the other connecting member.

23. Apparatus according to claim 22, wherein one of the guide members comprises a roller which engages a surface of the other guide member which is parallel to the axis of the said slot.

24. Apparatus according to claim 14, wherein the means connecting the hopper with the supporting structure comprise a pair of runways, rollers mounted on the hopper and engaging in the runways and stops limiting the upward and downward movement of the rollers along the runways, and wherein the guide means comprise at least one guide roller which is mounted on the hopper and which is adapted to engage a guide surface extending parallel to the runways.

References Cited in the file of this patent

UNITED STATES PATENTS

| | | |
|---|---|---|
| 1,196,364 | Hytrek | Aug. 29, 1916 |
| 1,226,261 | Rosendahl | May 15, 1917 |
| 1,278,131 | French | Sept. 10, 1918 |
| 1,356,149 | Hubback | Oct. 19, 1920 |
| 1,761,801 | Robb | June 3, 1930 |
| 1,820,547 | Walker | Aug. 25, 1931 |
| 1,855,420 | Robb | Apr. 26, 1932 |
| 2,087,138 | Brick | July 13, 1937 |
| 2,133,170 | Johnson | Oct. 11, 1938 |
| 2,213,047 | Maxon et al. | Aug. 27, 1940 |
| 2,271,518 | Heine | Feb. 3, 1942 |
| 2,272,648 | Smith | Feb. 10, 1942 |
| 2,391,224 | Carter | Dec. 18, 1945 |
| 2,415,515 | McOscar | Feb. 11, 1947 |
| 2,498,117 | Smith et al. | Feb. 21, 1950 |
| 2,565,792 | Wagner et al. | Aug. 28, 1951 |

FOREIGN PATENTS

| | | |
|---|---|---|
| 617,497 | Great Britain | Feb. 7, 1949 |